(12) United States Patent
Lim et al.

(10) Patent No.: US 8,170,962 B2
(45) Date of Patent: May 1, 2012

(54) METHOD AND APPARATUS FOR AN ALGORITHM DEVELOPMENT ENVIRONMENT FOR SOLVING A CLASS OF REAL-LIFE COMBINATORIAL OPTIMIZATION PROBLEMS

(75) Inventors: Meng Hiot Lim, Singapore (SG); Yi Liang Xu, Singapore (SG)

(73) Assignees: Singapore Technologies Dynamics Pte Ltd, Singapore (SG); Nanyang Technological University, Singapore (SG)

( * ) Notice: Subject to any disclaimer, the term of this patent is extended or adjusted under 35 U.S.C. 154(b) by 992 days.

(21) Appl. No.: 12/097,254

(22) PCT Filed: Dec. 8, 2006

(86) PCT No.: PCT/SG2006/000382
§ 371 (c)(1),
(2), (4) Date: Jun. 12, 2008

(87) PCT Pub. No.: WO2007/070012
PCT Pub. Date: Jun. 21, 2007

(65) Prior Publication Data
US 2008/0313113 A1 Dec. 18, 2008

(30) Foreign Application Priority Data

Dec. 13, 2005 (SG) ................. 200508032-0

(51) Int. Cl.
 G06F 15/18 (2006.01)
 G06N 3/00 (2006.01)
 G06N 3/12 (2006.01)
(52) U.S. Cl. ...................................................... 706/13
(58) Field of Classification Search .................. None
 See application file for complete search history.

(56) References Cited

U.S. PATENT DOCUMENTS
5,581,657 A 12/1996 Lyon
(Continued)

FOREIGN PATENT DOCUMENTS
EP 0762294 B1 5/2001

OTHER PUBLICATIONS

Lehner et al. "Probabilistic Plan Evaluation in a Classical Hierarchical Planner", 2nd Intl. Symposium on Uncertainty Modeling and Analysis, 1993, pp. 45-50.*

(Continued)

Primary Examiner — Jeffrey A Gaffin
Assistant Examiner — Li-Wu Chang
(74) Attorney, Agent, or Firm — Knobbe Martens Olson & Bear LLP

(57) ABSTRACT

The invention pertains to an algorithm development environment for solving a class of combinatorial optimization problems. Many practical real-life applications can be formulated as combinatorial optimization problems. Over the years, there have been algorithms proposed to solve these problems. The effort in customizing algorithms to fulfill a particular domain-specific application is still significant. Furthermore, conventional approaches towards codes generation and modification are tedious and thus inefficient. To address the need for rapid generation of algorithms that are efficient in solving a given class of real-life problems, embodiments provide a hierarchical tree structure for managing a procedure modules library. Based on the preferred management and object-oriented design concept, users configure and generate a genetic algorithm (GA) via an intuitive graphical user interface. The goal-seeking customization of the generated GA can be easily carried out for solving various optimization problems. This way, the efficiency of algorithm development is enhanced significantly.

16 Claims, 9 Drawing Sheets

U.S. PATENT DOCUMENTS

| | | |
|---|---|---|
| 6,086,617 A | 7/2000 | Waldon et al. |
| 6,112,126 A | 8/2000 | Hales et al. |
| 6,263,325 B1 | 7/2001 | Yoshida et al. |
| 6,286,017 B1 | 9/2001 | Egilsson |

OTHER PUBLICATIONS

O'Connor "Graphic Traversal Algorithms", in Notes for Algorithms & Data Structures, 2002, pp. 16.*

Spector "Genetic Programming and AI Planning System", AAAI 1994, pp. 1329-1334.*

International Preliminary Report on Patentability dated Jun. 18, 2008.

Filho et al., Genetic-Algorithm Programming Environments, Computer, Jun. 1994, 27(6): 28-43.

Harris et al., GP-Com: A Distributed, Component-Based Genetic Programming System in C++, Genetic Programming 1996 Conference, p. 1-10.

Stefanski et al., An Object-Oriented Toolkit for Evolutionary Algorithms, Seventh International Conference on Tools with Artificial Intelligence, Nov. 5-8, 1995, pp. 156-163.

TOMLAB, Wikipedia entry, http://en.wikipedia.org/wiki/TOMLAB (visited Feb. 10, 2009).

Voudouris et al., iOpt: A Software Toolkit for Heuristic Search Methods, Lecture Notes in Computer Science, 2001, 2239: 716-729.

* cited by examiner

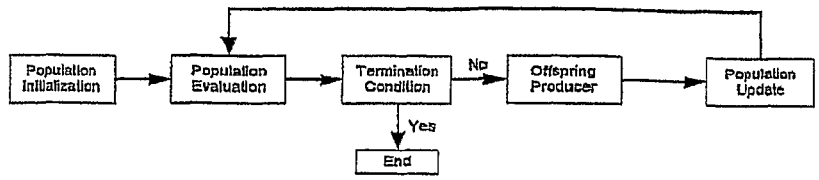
*Fig. 1A*
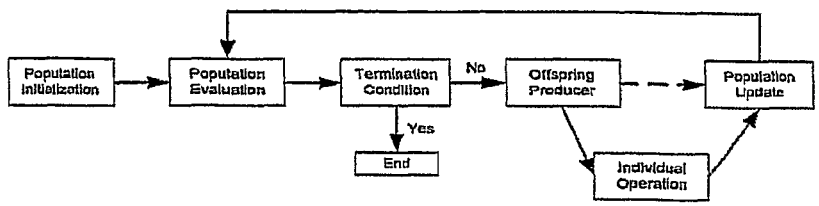
*Fig. 1B*
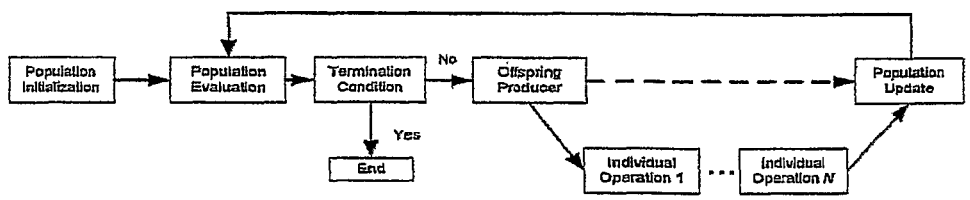
*Fig. 1C*
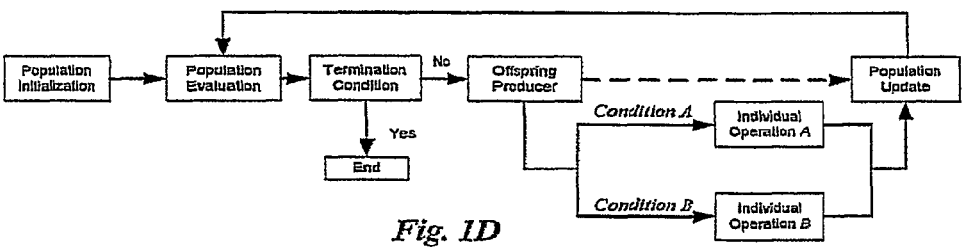
*Fig. 1D*
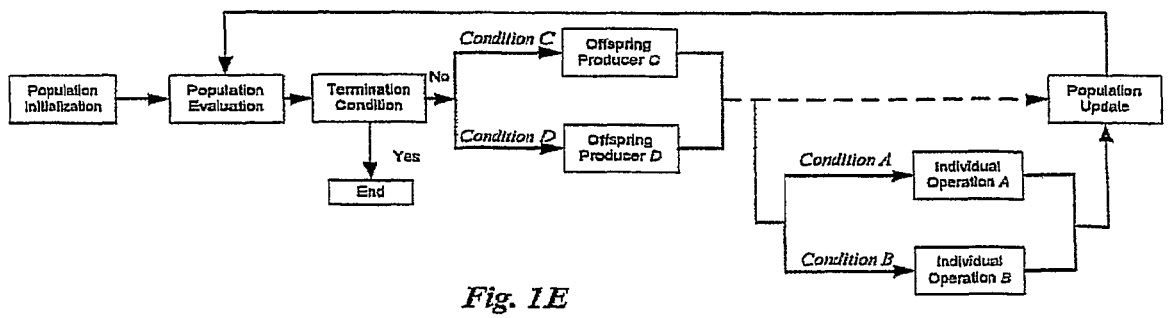
*Fig. 1E*
FIG.1

METHOD AND APPARATUS FOR AN ALGORITHM DEVELOPMENT ENVIRONMENT FOR SOLVING A CLASS OF REAL-LIFE COMBINATORIAL OPTIMIZATION PROBLEMS

FIELD OF INVENTION

The present invention relates to the field of integrated problem-solving. More specifically, the invention relates to a system that allows for the rapid development of a genetic algorithm with the possibility of hybridization with any other forms of a heuristics or metaheurististics search for solving a particular class of real-life applications of combinatorial optimization problems. This approach of customization of the algorithms is carried out with minimal effort in coding while delivering outcome in the form of algorithms that are efficient in solving a given class of problems. In one form, the invention relates to configuring a genetic algorithm (GA) to provide solutions for supply chain management, however it should be appreciated that the present invention is not limited to that use only.

BACKGROUND ART

The discussion throughout this specification comes about due to the identification of certain prior art problems by the inventors.

In the last few decades, there is a tendency of an increasing number of applications of combinatorial optimization in real life scenarios. Quite often, these real life scenario problems correspond to classes of combinatorial optimization problems that have been categorized in literature. As the dimension of the problem increases, the computational complexity of these problems tends to increase exponentially. These problems belong to a class of problems termed as NP-hard. The NP-hardness renders these optimization problems computationally intractable for exact enumerative approaches, or deterministic algorithms. Therefore, many heuristics as well as meta-heuristics based approaches have surfaced to address the needs for configuring quick and efficient solutions for these problems. These approaches are classified as approximate solution approaches, and the algorithms are usually non-deterministic in nature. Examples may include evolutionary computation, simulated annealing, tabu search, neural networks, adaptive greedy approach, and more recently swarm intelligence approaches such as ant colony optimization.

However, in order to harness the capability of these algorithms to solve real-life problems, one is usually required to put in considerable efforts in designing, implementing and customizing the algorithms to suit the specific nature of the problem domain. Conventional algorithm development processes tend to require a great deal of low-level code generation and modification, which is tedious and inefficient. With these considerations in mind, more and more people turned to developing platforms to facilitate the algorithm development and problem-solving process. Of particular interest is the class of problem-solving environments involving evolutionary algorithms which has attracted a lot of attention, due to its generality and robustness.

In U.S. Pat. No. 6,112,126, an adaptive object-oriented optimization system is presented, which incorporates goal-seeking intelligent software objects. However, this invention is exclusively dedicated to solve only process control optimization. It does not offer much help for general problem-solving.

In U.S. Pat. No. 6,263,325, U.S. Pat. No. 6,086,617, Epogy Process Integration and Design Optimization Software and Hierarchical Evolutionary Engineering Design System (HEEDS) software, problem-solving environments with various optimization techniques including genetic algorithms are presented. They provide a user-friendly interface for exploring various optimization tools for solving different optimization problems being addressed. This class of platforms facilitates the process of algorithm design and thus enhances the efficiency of problem-solving greatly. However, these software tools are essentially simulation environments. Though various algorithms can be configured and executed efficiently in these environments, the execution depends on the entire system. For applications which require embedded real-time solver, this class of environments does not offer the flexibility to configure an efficient stand-alone program, albeita turnkey problem-solving algorithm. In U.S. Pat. No. 5,581,657, distributed computing technology is introduced to enhance the problem-solving power of existing optimization techniques, in particular genetic algorithms. However, since it is still an algorithm executor in essence, it fails to address the need for quick generation of stand-alone problem-solving algorithm.

In U.S. Pat. No. 6,286,017, a graphical environment, which assists users to generate the stand-alone application rapidly, is presented. It contains a modular library, which is managed by spreadsheet, and adopts other software reuse technology. Users are able to retrieve the procedures from the library with the friendly GUI it provides. Based on the procedures selected, a stand-alone application is generated automatically. However, this invention only addresses the programming issue. It does not involve any algorithm design knowledge. Therefore, it may not meet the needs of solution methodology when complex algorithms like meta-heuristics need to be developed.

TOMLAB is a general optimization environment in MATLAB. It is essentially a MATLAB toolbox, which encapsulates various optimization procedures, including complex meta-heuristics like a genetic algorithm. It supposedly makes it easier for users to retrieve the integrated procedures and routines to build up an application in the form of source codes. However, it cannot generate the source codes automatically and the user has to deal with the functional programming language, i.e. MATLAB programming language. This is a big obstacle for users who may not be familiar with MATLAB language. Furthermore, it requires the support of an expensive third party software environment, i.e. MATLAB.

Easy Specification of Evolutionary Algorithm (EASEA) is a high-level script language dedicated to the specification of evolutionary algorithm (EA). It retrieves various EA procedures and routines from well-known EA libraries: GALib and EO. Users compose the .ez file in EASEA language for configuring an evolutionary algorithm. The .ez file is then compiled by EASEA compiler to C++ files. The generated C++ files are in turn compiled and linked with the corresponding library to produce an executable file implementing the evolutionary algorithm specified in the original .ez file. This way, the most tedious codes generation job in algorithm development may be avoided. Therefore the efficiency of application development may be enhanced significantly. However EASEA, as well as another similar language: Evolutionary Algorithm Modeling Language (EAML), is still a form of text-based language, though it is of a higher level of abstraction than any functional programming language. These two script languages both require a specifically designed compiler to translate the script language to a functional programming language. Furthermore, it is necessary for general users to be familiar with the syntax of the language.

Any discussion of documents, devices, acts or knowledge in this specification is included to explain the context of the invention. It should not be taken as an admission that any of the material forms a part of the prior art base or the common general knowledge in the relevant art on or before the priority date of the disclosure and claims herein.

SUMMARY

In general terms, the present invention provides a data structure for configuring a procedural component of a search algorithm for solving at least one combinatorial-optimization problem, and methods and apparatus using the structure. The data structure is a tree having nodes associated with ways of configuring the procedural component. A traversal of the data tree corresponds the steps of configuring the procedural component.

A user is led through the tree structure node-by-node by a traversal algorithm, at each node making a selection between the available options. Some of the options include ones which determine which route the traversal algorithm takes through the tree structure. This makes possible a generic software system, which provides an open and friendly interface; enabling users to quickly configure an evolutionary algorithm based solution methodology and automatically optimize the configurations of the algorithm for solving a class of combinatorial optimization problems. The class of problems addressed is those where the solutions can be represented as permutation string structures.

A first specific expression of the invention is a method of configuring one or more procedural components of a search algorithm for solving at least one combinatorial-optimization problem, the method employing for each procedural component a corresponding a data structure representing ways of configuring the procedural component, the data structure comprising a plurality of nodes associated together in a tree structure, a plurality of said nodes representing respective choices which are to be made to configure the procedural component, said method comprising configuring said procedural component by traversing the tree structure by a traversal algorithm in which a plurality of said nodes are labelled successively as a current node, and, upon the current node representing a choice which is to be made to configure the procedural component, receiving input making the choice represented by the current node.

From an alternative point of the invention can be expressed in terms of a data structure for use in the method.

Specifically, an alternative expression of the invention is a data structure for use in configuring a procedural component of a search algorithm for solving at least one combinatorial-optimization problem, wherein the data structure comprises a tree structure representing possible configurations of the procedural component of the algorithm, the tree structure comprising:

a primary node representing the component of the algorithm;

one or more first nodes stemming from the primary root node, each first node being either (i) a variation node representing one or more options for configuring the procedural component, or (ii) a property node representing one or more choices which are required to configure the procedural component one or more second nodes, each stemming from one of the first nodes, wherein in the case of a second root node stemming from a variation node the second node represents one of the corresponding options, and in the case of a second node stemming from a property node the second node represents one of the choices.

An alternative expression of the invention is a data structure for use in configuring a procedural component of a search algorithm for solving a combinatorial-optimization problem, wherein the data structure comprises a tree structure representing possible configurations of the component procedure of the algorithm, the tree structure comprising a plurality of sub-trees linked together in a hierarchical structure;

each sub-tree being associated with a corresponding aspect of the procedural component, and being one of:

a variation subtree associated with a plurality of options for configuring the corresponding aspect of the procedural component, or a property subtree associated with one or more choices which are required by the corresponding aspect of the procedural component.

In a further aspect the present invention provides a data format for use in configuring an algorithm for solving a combinatorial-optimization problem wherein the data format comprises a tree structure, the tree structure comprising:

a primary root node;

at least one first root node stemming from the primary root node;

at least one second root node stemming from the first root node wherein the at least one second root node comprises one of:

a) a variation for the first root node;

b) a node pointing to one or more variations for the first root node;

c) a property common to each variation for the first root node;

d) a node pointing to a property common to each variation for the first root node;

e) a further first root node;

f) a further second root node;

g) a NULL.

In another aspect the present invention provides a method of configuring at least one procedural component of a heuristic search procedure for use in generating an algorithm for solving at least one combinatorial-optimization problem, the at least one procedural component comprising a tree structure having variation nodes and property nodes, said method comprising traversing the tree structure in accordance with the following steps:

a) selecting a sub tree comprising a root node stemming from a primary root node of the tree;

b) selecting one node stemming from the root node;

c) determining whether the selected one node is a leaf node or a root node for a further sub tree;

d) if the selected one variation node is a root node for a further sub tree repeating steps b) and c) for the further sub tree;

e) if the selected one node is a leaf node, returning a value of the leaf node to configure the procedural component;

wherein steps a) to e) are performed such that precedence is given to variation nodes over property nodes.

Preferably, the algorithm may comprise a genetic algorithm and/or a hybrid genetic algorithm.

In a further aspect the present invention provides a method of configuring a genetic algorithm for solving an optimization problem, the method comprising the steps of:

a) providing an initial population of chromosomes representing respective possible configurations of the genetic algorithm;

b) evaluating the population of chromosomes based on a fitness function to thereby designate members of the population as a parent generation;

c) performing one or more genetic operations upon the parent generation to reproduce an offspring generation;

d) updating the population with the offspring generation together with the parent generation;

e) determining whether a termination condition is met for an updated population;

f) repeating steps a) to e) until the termination condition is met.

In a preferred aspect the present invention provides apparatus adapted to configure at least one procedural component of a heuristic search procedure for use in generating an algorithm for solving at least one combinatorial-optimization problem, said apparatus comprising processor means adapted to operate in accordance with a predetermined instruction set, said apparatus in conjunction with said instruction set, being adapted to perform the method as disclosed herein.

In another preferred aspect the present invention provides a computer program product comprising:

a computer usable medium comprising computer readable program code and computer readable system code embodied on said medium for configuring at least one procedural component of a heuristic search procedure for use in generating an algorithm for solving at least one combinatorial-optimization problem within a data processing system, said computer program product comprising:

computer readable code within said computer usable medium for performing the method steps of any one of the methods as disclosed herein.

Preferred embodiments of the present invention make it possible to address the needs and challenges of a turn-key solution provider. They provide a platform for developers to configure algorithms that are efficient for solving real-life optimization problems by means of an integrated problem-solving environment. Users or system integrators with no profound background knowledge on algorithm design and moderate level of programming skill, may use the platform to configure and generate a genetic algorithm hybridized with any of the heuristics or meta-heuristics provided for in the environment. The result is a stand-alone program generated based on very high level user-specifications. Users require minimal coding effort to customize the generated program for solving various problems of interest by introducing the problem-domain specific features into the source codes. This way, the efficiency of algorithm development is enhanced significantly. The present invention is particularly applicable to the class of optimization problems with a permutation solution structure, since the solution of many real-life problems may be formulated as a permutation string.

Other aspects and preferred aspects of the invention are disclosed in the specification and/or defined in the appended claims, forming a part of the description of the invention.

In particular, certain embodiments of the present invention provide a number of advantages and/or advantageous results, as follows:

1. An integrated problem-solving environment for design and development of efficient algorithms for solving complex optimization problems.

2. The environment relates to a development platform for designing and configuring variants of hybrid genetic algorithms.

3. A genetic algorithm development platform focusing on a class of widely applicable combinatorial optimization problems whereby the solutions structure can be represented as permutation string.

4. The genetic algorithm development platform further comprising a module-based procedural library.

5. The module-based library adopts a novel hierarchical tree structure of left variation-right property tree structure as a means to manage and organize the procedural modules.

6. The genetic algorithm development platform further comprises high level graphical user interface for configuring hybrid genetic algorithms.

7. The graphical user interface realizes the visualization of the tree structure for algorithms configuration.

8. The left variation-right property tree structure further comprises a left variation-right property tree rule for traversal. This traversal rule, together with the depth-first tree traversal rule, guides the user to complete the configuration of an algorithm by traversing along the hierarchical tree and subtrees.

9. The module-based library is based on an object-oriented framework.

10. A source codes generator, which is able to generate stand-alone program based on user-specified configuration, and is implemented based on the objected-oriented module-based library and the above tree structure.

11. Goal-seeking-based customization of the program is generated by the source codes generator for solving various optimization problems.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further disclosure, objects, advantages and aspects of the present application may be better understood by those skilled in the relevant art by reference to the following description of preferred embodiments taken in conjunction with the accompanying drawings, which are given by way of illustration only, and thus are not limitative of the present invention, and in which:

FIG. 1 shows some possible functional constructs of genetic algorithm (or hybrid genetic algorithm) flowcharts consisting of procedural components in search algorithms which may be configured by methods and apparatus which are embodiments of the present invention.

DETAILED DESCRIPTION

Figure 2:
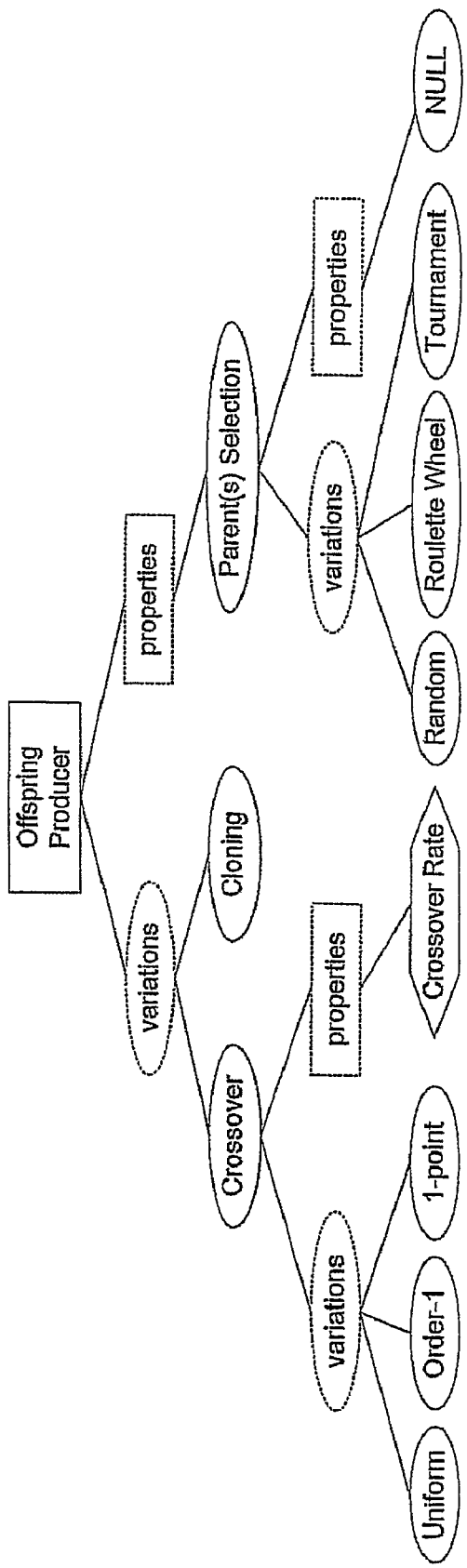
FIG. 2 shows an embodiment of the invention which is a hierarchical tree structure for the component Offspring Producer.

The present invention has wide-ranging practical applicability. A proof of its utility as a problem-solving environment has been carried out for an application with industrial relevance. Using the Algorithm Development Environment for Permutation-based problems of the present invention, a hybrid genetic algorithm was generated and subsequently integrated into a supply chain management workflow. The hybrid GA served as the planning and scheduling engine to manage the distribution of fuels by a fleet of trucks to retail outlets (refueling stations for motorists). Each retail outlet submits an order or request for the type and quantity of fuels for replenishing.

We termed the overall planner as a fuel truck dispatch system (FTDS). Each truck has a limited capacity. It carries only a limited amount of fuels for dispatch to the various stations in a given zone, starting from a designated depot or distribution centre. The main objective of optimization is to minimize the dispatch cost, which is usually measured by the overall travelling distance or time. FTDS helps a human planner to generate a set of routes for the fuel trucks. Besides the limitation of truck capacity, there usually are more constraints, such as time factor (delivery within a specified time window) and priority of service, which need to be taken into account.

We configured a hybrid genetic algorithm and generated the corresponding source codes as a preferred embodiment of the present invention. After incorporating the problem domain specific features, such as the truck and station information, distance information etc., an alpha version of the scheduler was achieved in a fairly short time. With a conventional approach of system development, a coding cycle for the algorithm may require weeks or even months.

A conventional algorithms development process usually requires significant effort in low-level codes generations and modifications. This is tedious and inefficient, and unlikely to be able to keep up with the drastic increase in number as well as diversity of applications, coupled with the fact that the complexity level of some problem areas demands handcrafted algorithms to achieve a decent acceptable level of performance. With these considerations in mind, there is a need to develop a platform to integrate the resources pertaining to design and development of algorithms for solving a particular class of problems. In embodiments of the present invention, we focus on the class of optimization problems which have permutation solution structure. This means that any possible solution for the problem can be coded as a permutation string.

In a preferred embodiment of the present invention a typical system incorporates procedural modules for configuring solution methods for solving optimization problems well-suited for the class of problems being addressed. With these embodiments, heuristic-based procedures for a genetic algorithm may be conveniently configured.

FIG. 1 shows some possible configurations of GA (or hybrid-GA) flowcharts. From the figure, there are six components in the GA modules. First, the Population Initialization procedure produces an initial population of chromosomes. Then, in the generation loop, these chromosomes are evaluated based on the fitness function. In most cases, the statistical information on the population also needs to be obtained through the Population Evaluation procedural module. After that, the population of individuals is designated as the parent generation. Using the Offspring Producer procedures (e.g. crossover and/or cloning), the parents reproduce to create members of the offspring generation. Although not necessary in GA, Individual Operations (e.g. mutation and/or local search) are often applied to alter or improve the genetic composition of these existing members of the offspring generation. Finally, following the Population Update mechanism, the resulting offspring generation together with the parent generation, constitutes a new population of parent generation for further reproduction. This process is repeated until the GA search converges or the termination condition is met.

Each component of the modules is associated with a set of properties and attributes providing users with options for tuning and testing the various configurations of an algorithm. All the properties and attributes are managed and organized in a hierarchical tree structure. We refer to such a structure as left variation-right property tree structure.

FIG. 2 denotes the tree structure for the Offspring Producer component. It is used to generate the offspring individuals from the parent population for subsequent reproduction operations. The left child variations of the Offspring Producer in the form of a dashed line elliptical node serves as the root of the left subtree to denote the variations of its parent, i.e. Offspring Producer, (e.g. Crossover and Cloning etc.) while the dashed line rectangular block "properties" serves as the right child is the root of the right subtree to indicate the common properties of all the variations of Offspring Producer, such as Parent(s) Selection. Similarly, the subsequent subtrees are managed and organized by the same structure. For example, one of the variations of Offspring Producer, Crossover contains variations like Uniform Crossover, Order-1 Crossover, One-point Crossover and so on, which are organized in its left subtree. Meanwhile, all these variations have one common feature, i.e., Crossover Rate, a real number parameter which is represented in a hexagonal block. Therefore, it is denoted as a node in the right subtree of Crossover. It is noted that the dashed line blocks "variation" and "property", also define the rule for configuring left and right subtrees in different ways. For "variation" subtree, a user only needs to choose one child of it (i.e. one variation) and configure the corresponding subtree of the child. For "property" subtree, all the children need to be configured. This rule is recursively applied as the system implements a traversal algorithm to traverse the pre-existing tree structure, requesting input from the user at all points where a selection from a number of choices or of a numerical value is required. The system thereby guides a user to configure a feasible algorithm.

As would be recognised by the person skilled in the art, it is not difficult to understand that this hierarchical tree structure is open to accommodate other procedures for embellishment. The procedures may be located at the same level as the existing procedures as their siblings. For example, other crossover operators, like partially matched crossover (PMX), may be easily introduced to the system by locating them as the siblings of the existing Uniform Crossover, Order-1 Crossover and One-point Crossover. Their corresponding attributes and features are managed using the same tree structure as mentioned earlier. Therefore, this structure may allow for a system that is open and easily scalable.

Note that the tree structure can be redrawn in a number of ways without changing its significance or usefulness, and without excluding the tree structure from the scope of the present invention. For example, the property (right) subtree of the node labelled Parent(s) Selection is empty ("NULL"), indicating that no property has to be chosen. In another technique for drawing the tree structure within the scope of the invention, the node marked NULL can be omitted from the diagram. In yet another technique for drawing the tree structure, the node marked "properties" can also be omitted.

Figure 3:
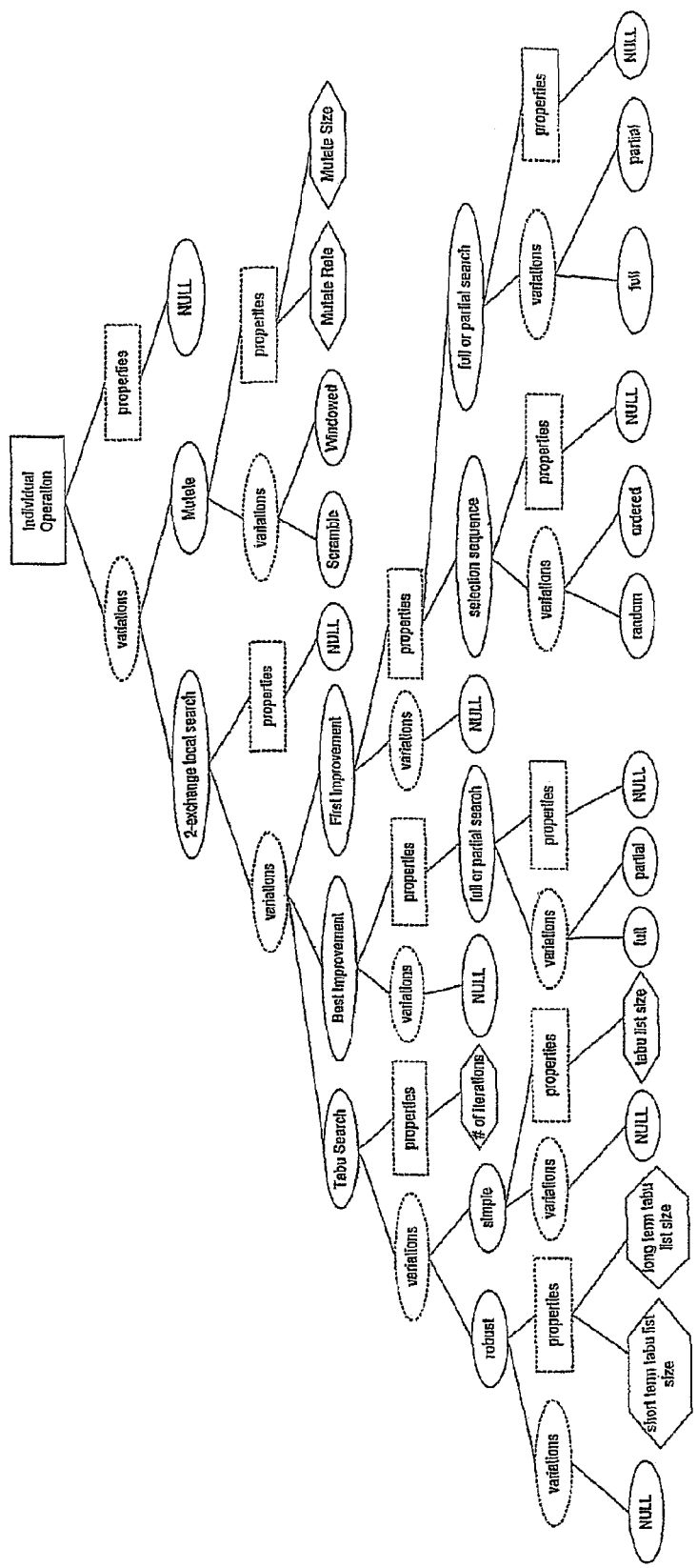
FIG. 3 shows an embodiment of the invention which is a tree structure for the component Individual Operation.

FIG. 3 shows the tree structure for the Individual Operation component. It is the set of procedures that are applied to an existing individual for improving its quality or altering its structure. We incorporate two forms of Individual Operation; 2-exchange local search and Mutation. Several variations of local search like tabu search as well as two forms of mutations (scramble mutation and windowed mutation) were incorporated. As stated above, any established procedures may be introduced by following the left variation-right property rules.

Figure 4:
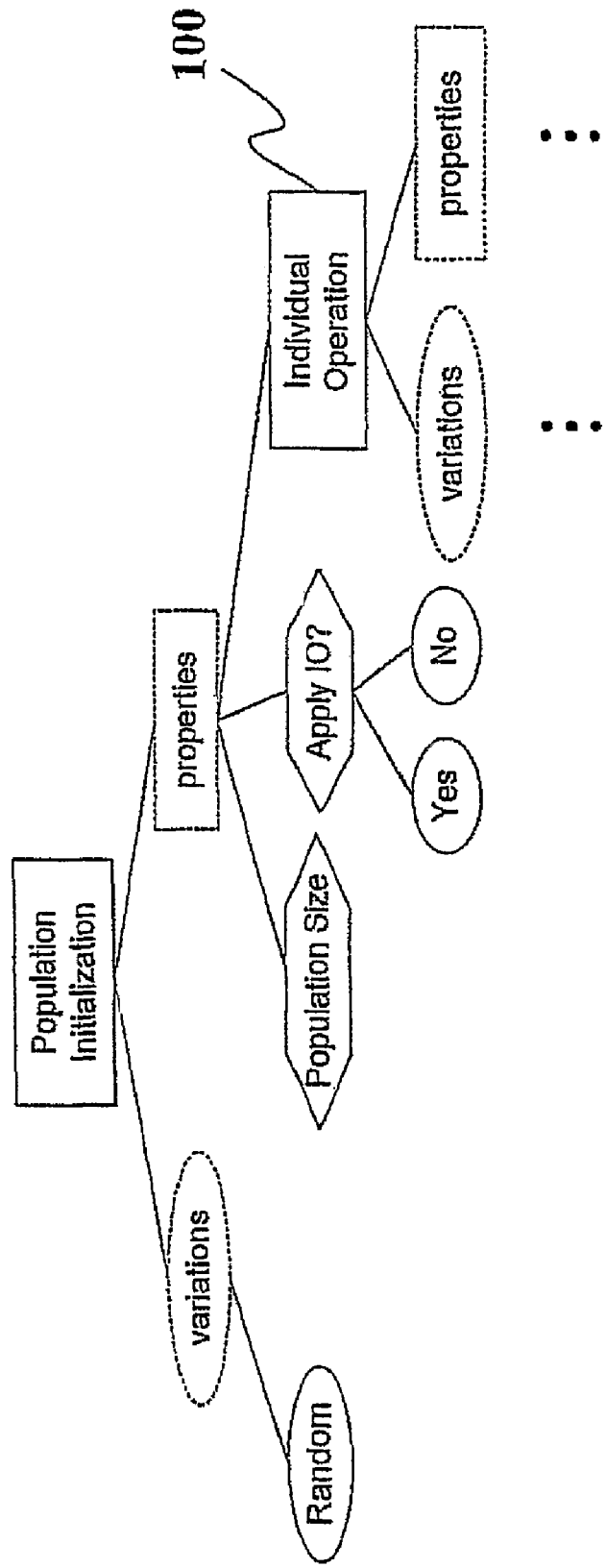
FIG. 4 shows an embodiment of the invention which is a tree structure for the component Population Initialization.

FIG. 4 shows the tree structure for the Population Initialization component. A genetic algorithm starts with an initial population to be designated as the parents. The Population Initialization procedure is responsible to generate such initial population. In this component, population size, an important GA parameter, is specified. The quality of the initial population of individuals can have significant impact on the performance of the entire genetic algorithm. Therefore, it is common to apply some sort of heuristics based local search to improve the quality of the initial population. The present invention provides users the option to apply Individual Operation on the initial population of individuals. It is noted that, item 100 in FIG. 4 is an independent instance of Individual Operation. The configuration of it can be different from that of the Individual Operation in the generation loop (if any). We omit the structure of this subtree in FIG. 4, which has been presented in details by means of FIG. 3.

Figure 5:
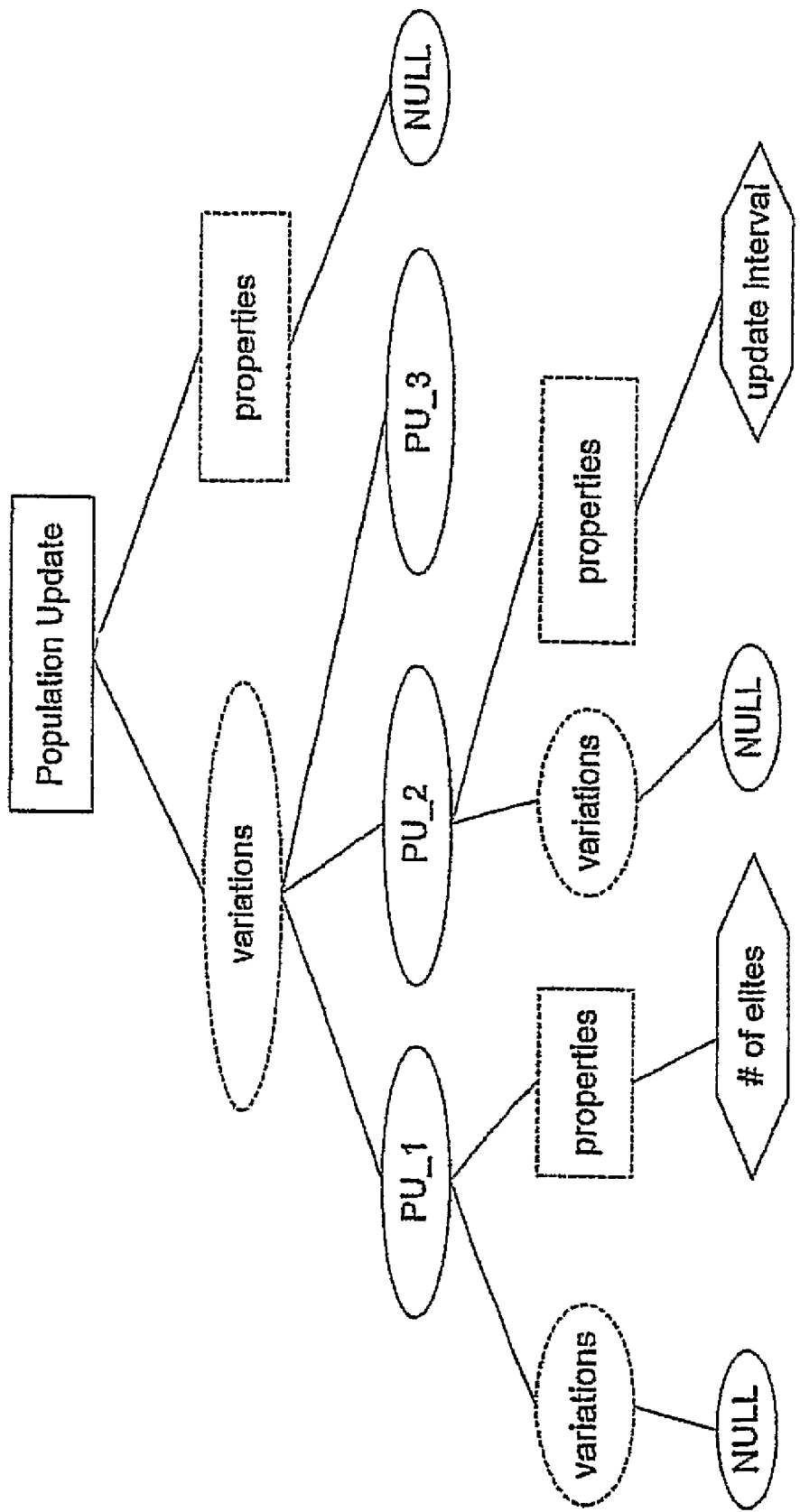
FIG. 5 shows an embodiment of the invention which is a tree structure of the component Population Update.

FIG. 5 shows the tree structure of the block Population Update. It is used to determine which offspring should be accepted into the selection pool for further reproduction of the next generation. The three schemes are shown as subtrees and a brief explanation of each scheme follows:

PU_1: Overlapping population replacement with a certain number of elites (# of elites).

PU_2: Once a certain number (update interval of offspring are produced, only the best chromosomes from both parents and offspring are accepted and added into the selection pool.

PU_3: Only the child that is better than the worst-existing parent and different from members in the existing population is accepted.

The # of elites and the update interval are the properties and are set as real number parameters of PU_1 and PU_2 respectively.

Figure 6:
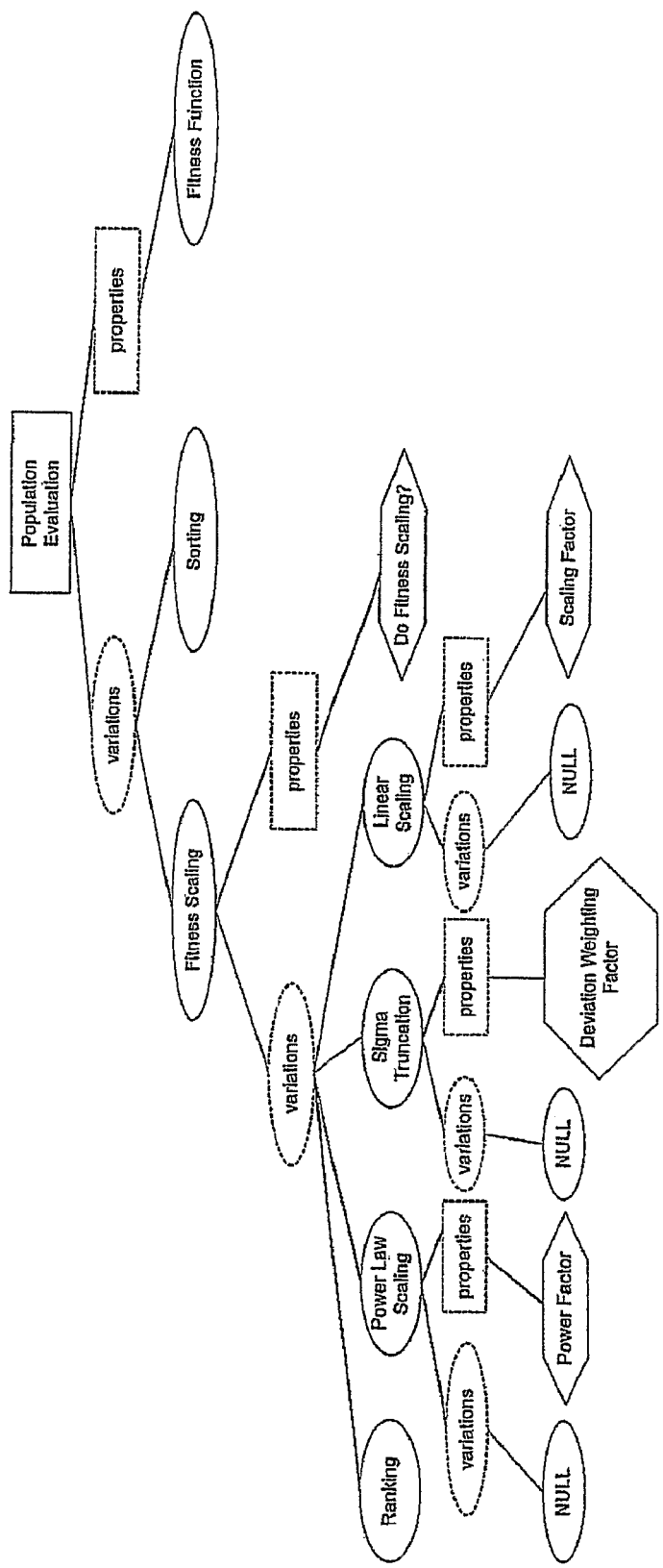
FIG. 6 shows an embodiment of the invention which is a tree structure of the component Population Evaluation.

FIG. 6 shows the tree structure of the block Population Evaluation. It is used to evaluate the current parent population. Therefore, the Fitness Function, which is used to evaluate the fitness of an individual, is encapsulated in this component as its property. Besides, some pre-processes, like Fitness Scaling and Sorting, are often applied to the parent population before reproduction starts. We introduced four types of scaling methods: Linear Scaling, Sigma Truncation, Power Law Scaling and Ranking. Some of them are associated with real number parameters, which are set as properties associated to the corresponding methods of scaling.

Figure 7:
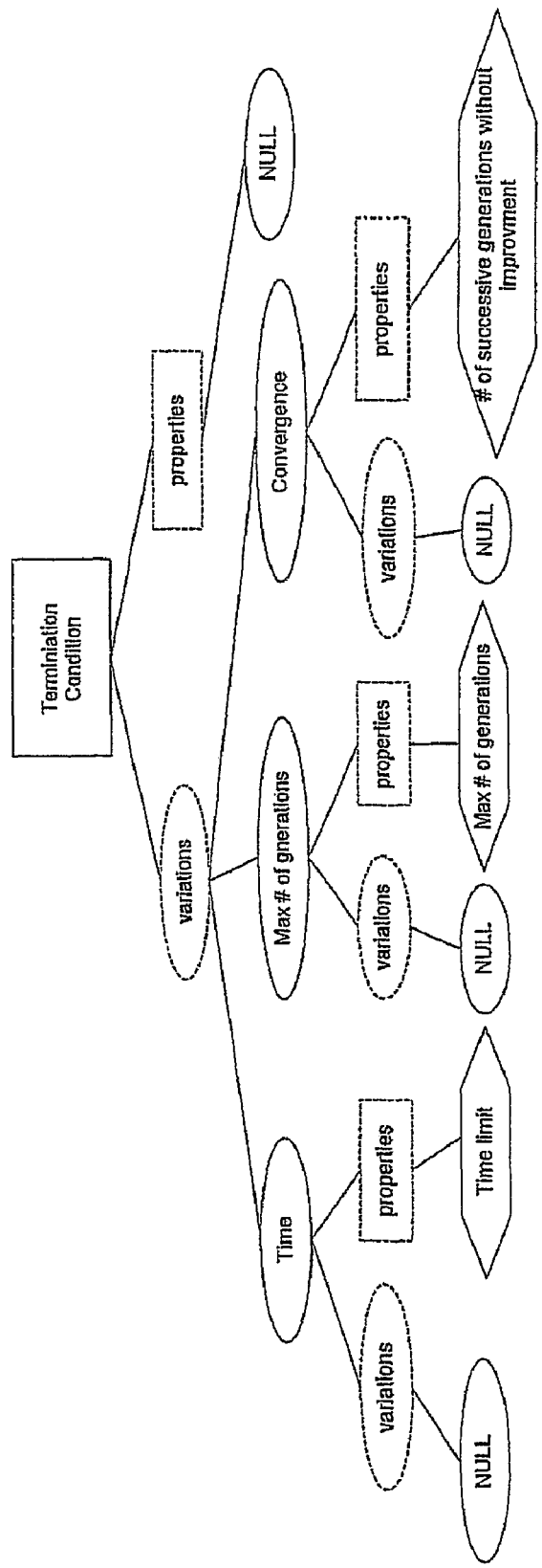
FIG. 7 shows an embodiment of the invention which is a tree structure of the component Termination Condition.

FIG. 7 shows the tree structure of the block Termination Condition. It is used to control the modes of terminating the genetic algorithm. We implemented three criteria: Time, Max # of generations and Convergence. The time criterion terminates the genetic algorithm when the user-defined computational time limit is reached, while the Max # of generations criterion terminates the algorithm when the number of iterations reaches the user-specified number of generations. The Convergence criterion detects if the evolution converges by counting the number of successive generations without any improvement in solution quality. Once the number exceeds a user-defined value, the evolution process is deemed to have converged and thus, is terminated.

With the module-based procedural library, which is managed by the hierarchical tree structures introduced above, users are free to explore various aspects of algorithm design.

From FIG. 2 to FIG. 7, it is shown that, possible "features" associated to an algorithm that is being configured are located as the leaf nodes in the corresponding trees. This indicates that, the job for a user to determine a certain "feature" of an algorithm is essentially the process of finding a path from the root node to a particular leaf node in the corresponding tree. Therefore, the task of configuring a complete algorithm becomes a process of traversing the trees to find a set of paths starting from the root nodes to the leaf nodes, recursively applying the left variation-right property rule described above. In the present invention, the depth-first mode of traversing is applied.

Figure 8:
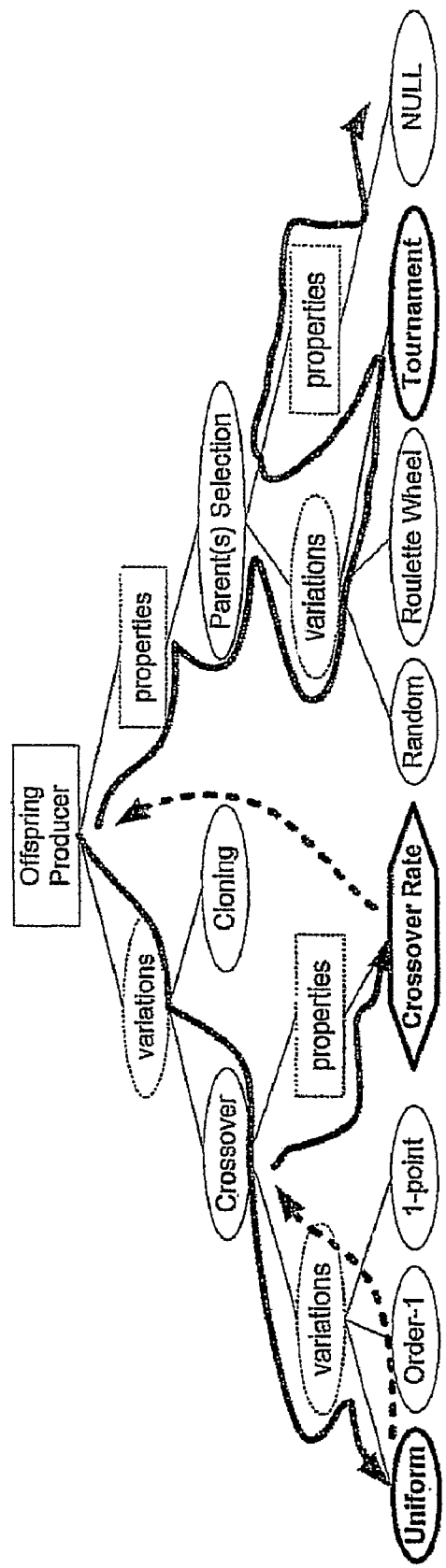
FIG. 8 illustrates the flow of a sample configuration for the component Offspring Producer.

FIG. 8 illustrates the flow of a sample configuration of the component Offspring Producer. Starting from the root, it first traverses the variation (left) subtree of Offspring Producer. According to the left variation-right property rule, only one variation, for instance Crossover, is chosen. It then continues to traverse the corresponding subtree (Crossover). Due to the depth-first rule (inorder traversal, LVR mode), it traverses the variation (left) subtree of Crossover first. Assuming that the user chooses the Uniform crossover, it reaches the first leaf node, and continues to traverse the property (right) subtree of Crossover. Associated to it is a real number parameter Crossover Rate. After specifying the real value parameter for Crossover Rate, the flow proceeds to the second leaf node and goes on to traverse the property (right) subtree of Offspring Producer. Hereon, only the Parent(s) Selection feature remains to be configured. To do this, we start by traversing the variation (left) subtree of the Parent(s) Selection. Assuming that the user chooses Tournament out of the three variations of Parent(s) Selection available, it reaches the third leaf node. Since the property (right) subtree of Parent(s) Selection is empty (NULL), the traversal for this tree and the configuration of this component is accomplished. The traversal process described above covers three paths from the root node to three leaf nodes: Uniform, Crossover Rate and Tournament. This way, the user configures a feasible Offspring Producer instance, which is a form of uniform crossover with tournament parent selection methodology and a real number crossover rate. The configuration of other components of the algorithm can be similarly carried out to achieve a complete genetic algorithm.

It is noted that with the hierarchical tree structure, system developers are involved only in high level user-system interactions via a graphical user interface in process of configuring algorithms to address a specific problem area. The variations of any genetic algorithm may be represented by a flowchart, which is derived based on the blocks from the six components described above. The configuration of each component may be carried out with the tree structure visualization. With such an approach, even general users with limited algorithm design expertise are able to configure and design various genetic algorithms through very high level and intuitive graphical interface. This way, the efficiency of algorithm design is greatly enhanced.

After configuring the desired genetic algorithm, a user is able to use the codes generator of the present invention to generate source code, for example, C++ source code files based on the configuration he/she specified. The present invention adopts an object-oriented framework to facilitate codes generation functionality. Each node (except the "variation" and "property" nodes, which can be deemed as accessorial nodes) in the tree structure is regarded as an object (even for the real number parameter since it may have properties like range, precision, etc.) and is implemented as a class. For any object in the trees, its properties subtree members can be represented as the member variables of the class.

The variation children can be realized as the subclasses of the parent (base class). The children may further have their own features, i.e. variations and/or properties, which can be similarly set as their super classes and/or member variables. From the descriptions above, the user-configuration information is stored in the tree structure. The rationale of the codes generator in the preferred embodiment is to follow the paths from the root to leaf nodes, defined by user-configuration, and then retrieve and generate the corresponding objects/classes in terms of .h files and .cpp files. All the generated files constitute a stand-alone program. It can be viewed as a genetic algorithm module for solving various real-life problems.

Figure 9:
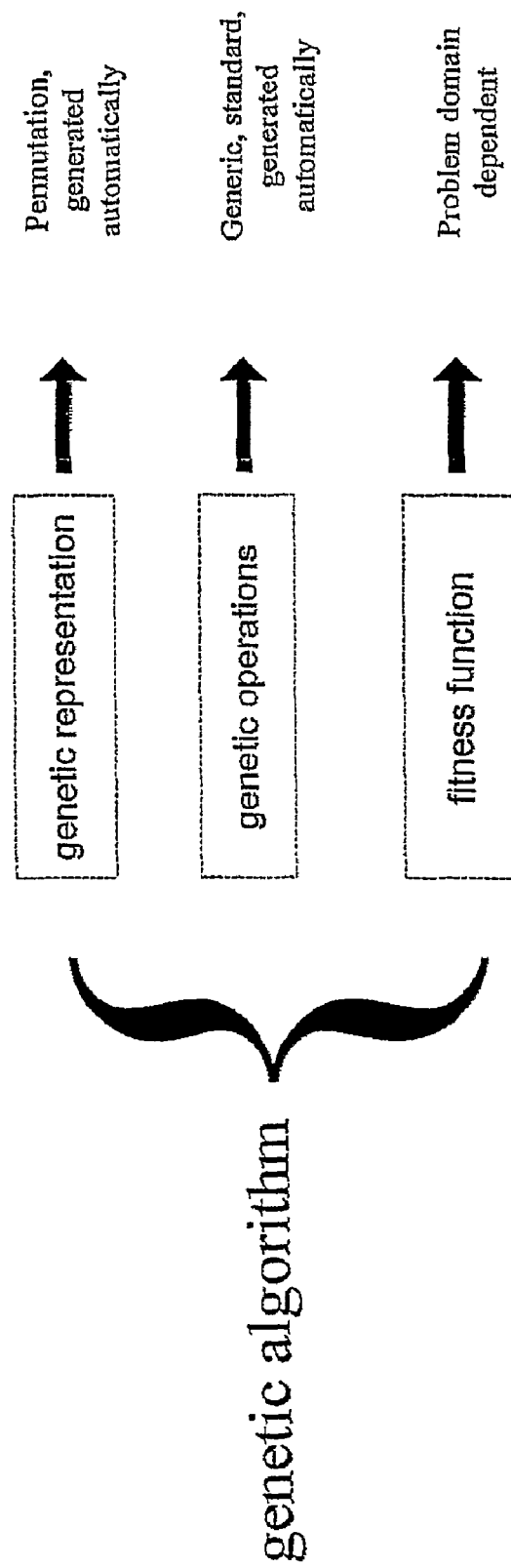
FIG. 9 shows the division of any genetic algorithm into three components from a structural viewpoint.

As shown in FIG. 9, any genetic algorithm can be divided into three components from a structural viewpoint: genetic representation, genetic operations and fitness function. The preferred embodiment of the present invention focuses on the permutation-based optimization problems. The artificial chromosomes coded as permutation strings are generated automatically. All the genetic operations, like crossover and mutation, are specifically designed for handling permutation strings. They are usually problem-independent, though different operations may lead to performance that varies with problems. Therefore, generation of the generic operations, which usually take the most time of the coding effort, are also carried out automatically following the users' high-level specifications. Only the fitness function involves the problem's domain-specific information, and thus is problem-dependent. Fitness function is used to evaluate individuals based on the domain-specific knowledge of the problem being addressed. It plays a crucial role in guiding the GA to explore the entire solution landscape. It is also crucial in guiding the algorithm towards convergence to the optimum. The domain-specific information of a given problem can be exclusively stored in a special generated class: problem. In principle, one only needs to manually implement the fitness function in the generated genetic algorithm module to customize it for solving a particular domain of problems. It is noted that, the blank module of the fitness function is also generated as a source codes placeholder. The user only needs to overwrite the function body of it to customize the algorithm for different problems. This way, the most time-consuming codes generation job in algorithm development is avoided. The effort for codes modification and customization is also minimized. Together with the high-level configuration process of algorithm design described above, it enhances the efficiency of the algorithm development significantly.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" when used in this specification is taken to specify the presence of stated features, integers, steps or components but does not preclude the presence or addition of one or more other features, integers, steps, components or groups thereof." Thus, unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

The invention claimed is:

1. A method of configuring one or more procedural components of a search algorithm for solving at least one combinatorial-optimization problem, the method employing for each procedural component a corresponding data structure representing ways of configuring the procedural component, the data structure comprising a plurality of nodes associated together in a tree structure, the plurality of nodes representing respective choices which are to be made to configure the procedural component, the method comprising:
configuring the procedural component by traversing the tree structure by a traversal algorithm, wherein the plurality of nodes are labeled successively as a current node;
upon the current node representing a choice which is to be made to configure the procedural component, receiving input making the choice represented by the current node;
wherein the tree structure includes one or more property subtrees, each property subtree being associated with one or more choices which are required by an aspect of the procedural component;
wherein each property subtree includes (i) a property node indicative of the existence of one or more choices which are adapted to configure an aspect of the component and (ii) one or more nodes stemming from the property nodes and representing the respective choices; the traversal algorithm, upon the current node being a property node, causing all of the nodes stemming from the property node to be labeled successively as the current node, and upon one of those nodes becoming the current node receiving input making the corresponding choice; and
wherein upon the current node being a node from which both a variation node and a procedural node stem, firstly the variation node is selected as the current node, and subsequently the property node is selected as the current node.

2. A method according to claim 1, wherein the algorithm comprises one of: a genetic algorithm; and a hybrid genetic algorithm; the algorithm operating by generating an initial population of chromosomes, and in successive iterations modifying the population of chromosomes.

3. A method according to claim 1, wherein the tree structure includes one or more variation subtrees, each variation subtree being associated with a plurality of options for configuring an aspect of the procedural component.

4. A method according to claim 3, wherein each variation subtree includes (i) a variation node indicative of the existence of a plurality of options for configuring an aspect of the procedural component and (ii) a plurality of nodes stemming from the variation node and representing the respective options; the traversal algorithm, upon the current node being a variation node, receiving input selecting a single one of the nodes stemming from the current node to be labeled as the current node.

5. A method of configuring one or more procedural components of a search algorithm for solving at least one combinatorial-optimization problem, the method employing for each procedural component a corresponding data structure representing ways of configuring the procedural component, the data structure comprising a plurality of nodes associated together in a tree structure, the plurality of nodes representing respective choices which are to be made to configure the procedural component, the method comprising:

configuring the procedural component by traversing the tree structure by a traversal algorithm, wherein the plurality of nodes are labeled successively as a current node;

upon the current node representing a choice which is to be made to configure the procedural component, receiving input making the choice represented by the current node;

wherein the algorithm comprises one of: a genetic algorithm; and a hybrid genetic algorithm; the algorithm operating by generating an initial population of chromosomes, and in successive iterations modifying the population of chromosomes; and wherein at least one of the procedural components comprises a Population Initialization procedure which produces the initial population of chromosomes.

6. A method according to claim 5, wherein at least one of the procedural components comprises a Population Evaluation procedure for evaluating the quality of the population.

7. A method according to claim 5, wherein at least one of the procedural components comprises an Offspring Producer procedure for generating new chromosomes using the existing chromosomes.

8. A method according to claim 5, wherein at least one of the procedural components comprises an operation performed on the chromosomes individually.

9. A method according to claim 5, wherein at least one of the procedural components comprises a termination procedure for determining when to terminate the algorithm.

10. A method according to claim 5, wherein the tree structure includes one or more variation subtrees, each variation subtree being associated with a plurality of options for configuring an aspect of the procedural component.

11. A method according to claim 10, wherein each variation subtree includes (i) a variation node indicative of the existence of a plurality of options for configuring an aspect of the procedural component and (ii) a plurality of nodes stemming from the variation node and representing the respective options; the traversal algorithm, upon the current node being a variation node, receiving input selecting a single one of the nodes stemming from the current node to be labeled as the current node.

12. A method according to claim 5, wherein the tree structure includes one or more property subtrees, each property subtree being associated with one or more choices which are required by an aspect of the procedural component.

13. A method according to claim 12, wherein each property subtree includes (i) a property node indicative of the existence of one or more choices which are adapted to configure an aspect of the component and (ii) one or more nodes stemming from the property nodes and representing the respective choices; the traversal algorithm, upon the current node being a property node, causing all of the nodes stemming from the property node to be labeled successively as the current node, and upon one of those nodes becoming the current node receiving input making the corresponding choice.

14. A method according to claim 13, wherein upon the current node being a node from which both a variation node and a procedural node stem, firstly the variation node is selected as the current node, and subsequently the property node is selected as the current node.

15. A method of configuring one or more procedural components of a search algorithm for solving at least one combinatorial-optimization problem, the method employing for each procedural component a corresponding data structure representing ways of configuring the procedural component, the data structure comprising a plurality of nodes associated together in a tree structure, the plurality of nodes representing respective choices which are to be made to configure the procedural component, the method comprising:

configuring the procedural component by traversing the tree structure by a traversal algorithm, wherein the plurality of nodes are labeled successively as a current node;

upon the current node representing a choice which is to be made to configure the procedural component, receiving input making the choice represented by the current node; and wherein upon the current node being a node from which a first type of node and a second type of node stem, firstly the first node is selected as the current node, and subsequently the second type of node is selected as the current node.

16. An apparatus for configuring one or more procedural components of a search algorithm for solving at least one combinatorial-optimization problem, the apparatus employing for each procedural component a corresponding data structure representing ways of configuring the procedural component, the data structure comprising a plurality of nodes associated together in a tree structure, the plurality of nodes representing respective choices which are to be made to configure the procedural component, the apparatus comprising:

means for configuring the procedural component by traversing the tree structure by a traversal algorithm, wherein the plurality of nodes are labeled successively as a current node;

means for, upon the current node representing a choice which is to be made to configure the procedural component, receiving input making the choice represented by the current node; and wherein upon the current node being a node from which a first type of node and a second type of node stem, firstly the first node is selected as the current node, and subsequently the second type of node is selected as the current node.

* * * * *